United States Patent [19]

Newell et al.

[11] Patent Number: 4,976,637
[45] Date of Patent: Dec. 11, 1990

[54] OUTBOARD MOTOR CONVERSION KIT

[76] Inventors: William K. Newell; John A. Newell; Shawn P. Newell, all of 2N715 Morton Rd., West Chicago, Ill. 60185

[21] Appl. No.: 375,038
[22] Filed: Jul. 3, 1989
[51] Int. Cl.⁵ .......................................... B63H 21/26
[52] U.S. Cl. .................................... 440/49; 440/113; 440/900; 440/89; 30/122
[58] Field of Search ............. 440/49, 113, 900, 6, 440/89; 30/122, 276, 347; 416/146 B, 146 R

[56] References Cited
U.S. PATENT DOCUMENTS
4,604,067 8/1986 Roberts .......................... 440/113
4,752,256 6/1988 Dorion .......................... 440/900

Primary Examiner—Sherman Basinger
Assistant Examiner—Stephen P. Avila
Attorney, Agent, or Firm—Edmond T. Patnaude

[57] ABSTRACT

A kit for converting a Weedwacker into an outboard engine and a method of using the kit includes the steps of rotating the tubular housing of the Weedwacker through one hundred eighty degrees, replacing the grass cutting device with a propeller, replacing the muffler of the Weedwacker with an elongate exhaust tube, clamping the exhaust tube to the tubular housing, and mounting a swivel support bracket to the tubular housing.

3 Claims, 2 Drawing Sheets

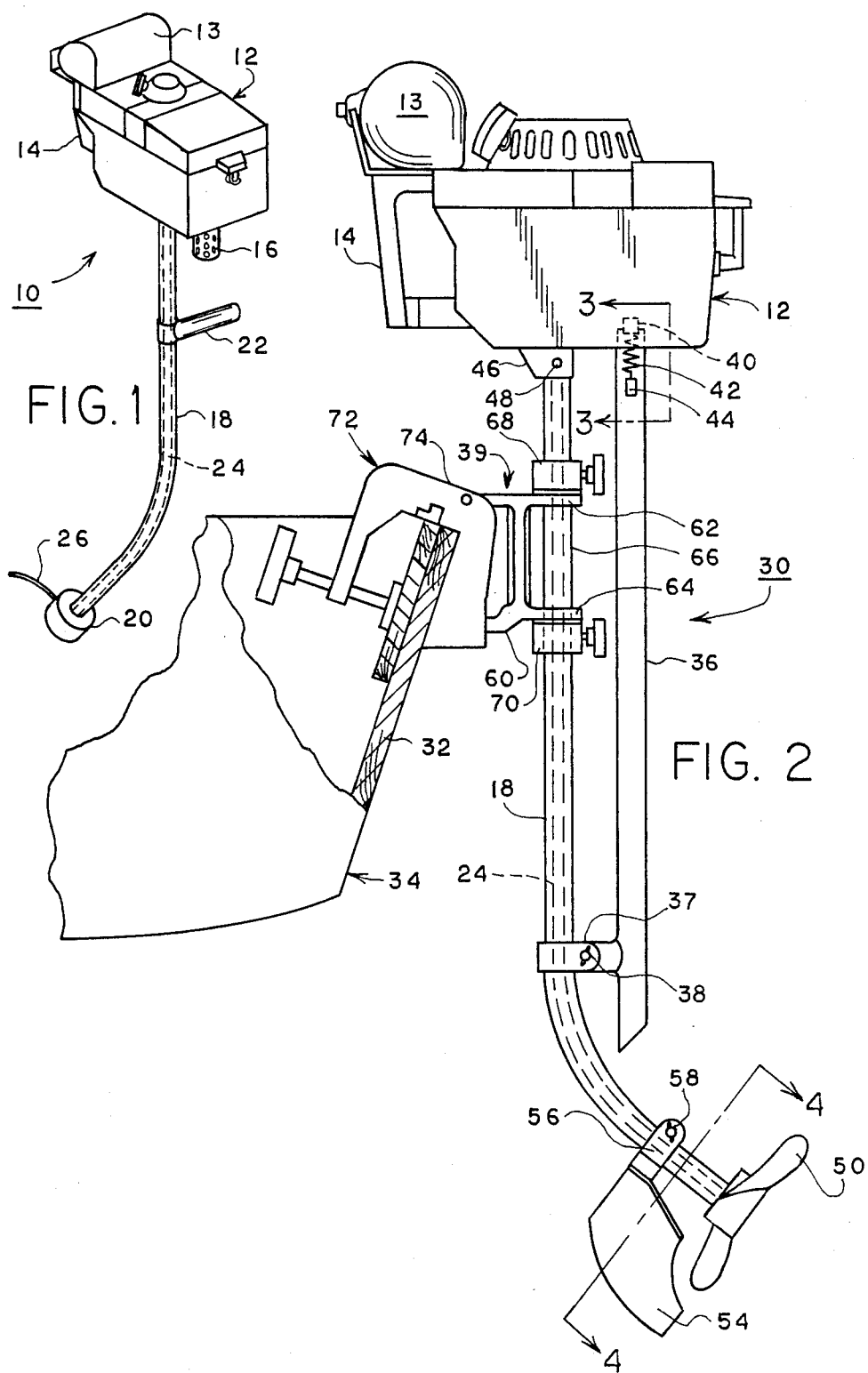

OUTBOARD MOTOR CONVERSION KIT

The present invention relates in general to outboard motors of the type used to propel small boats through the water, and it relates more particularly to a method and apparatus for converting a gasoline powered Weedwacker to an outboard motor.

BACKGROUND OF THE INVENTION

Weedwackers have become a common household appliance, and it is known in the prior art to use the power source of Weekwackers to drive other tools such as hedge trimmers, augers and the like by replacing the power train of the Weedwacker with a replacement power train. There has been no suggestion that the grass cutting blade of the Weedwacker could be successfully and economically replaced with a propeller because the cost of the replacement power drive would make the cost of the conversion excessive as compared to the cost of a comparable outboard motor. It would, however, be desirable for the owners of Weedwackers to be able to convert such devices to small outboard motors of the trolling type in a facile and inexpensive manner.

SUMMARY

Briefly, there is provided in accordance with the present invention a new and improved method and apparatus for converting a Weedwacker to an outboard motor by utilizing the entire power train of the Weedwacker and replacing only the grass-cutting blade with a propeller. In addition, the tubular drive housing of the power train, which includes a forty-five degree, bend is rotated through an angle of one hundred eighty degrees, a muffler which exhausts the hot gasses from the engine into the water is substituted for the usual muffler, and a swivel bracket assembly is rotatably attached to the tubular housing for mounting the converted motor to the transom of a boat. When using this conversion system, the axis of rotation of the propeller is normally directed at an angle of about forty-five degrees from the horizontal when the motor is in use, and we have found this to provide a particularly good drive for use with small fishing boats during trolling. Also, because the propeller is driven at a rate of speed which is much greater than is normal for outboard motors we have discovered that grass and the like which may collect around the propeller can easily be removed by simply tilting the propeller out of the water while the engine is running.

GENERAL DESCRIPTION OF THE DRAWING

Further objects and advantages and a better understanding of the present invention will be had by reference to the following detailed description taken in connection with the accompanying drawings wherein:

FIG. 1 is a perspective view of a gasoline powered Weedwacker of the type used to cut grass and weeds;

FIG. 2 is an elevational view, partly in cross-section showing an outboard motor, which has been converted from the Weedwacker of FIG. 1, mounted to the transom of a boat;

DETAILED DESCRIPTION OF A PREFERRED EMBODIMENT OF THE INVENTION

Figure 3:
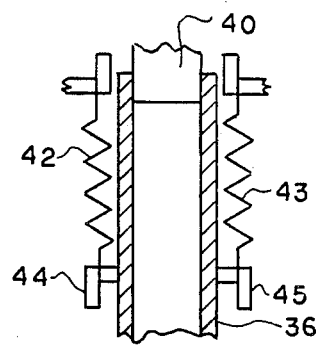
FIG. 3 is a cross-sectional view taken along the line 3—3 of FIG. 2.
Figure 4:
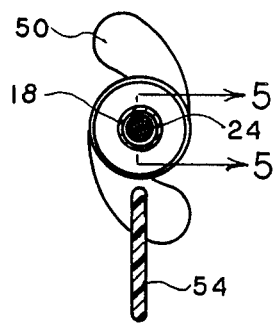
FIG. 4 is a cross-sectional view taken along the line 4—4 of FIG. 2.
Figure 5:
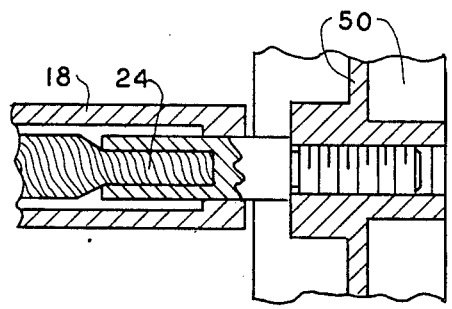
FIG. 5 is an enlarged cross-sectional view taken along the line of 5—5 of FIG. 4.

With particular reference to FIG. 1 there is shown a conventional Weedwacker 10 of the type including a power unit 12 including an engine (not visible), a fuel tank 13, a handle 14, a muffler 16, a tubular drive train housing 18, and a weed cutting head 20 mounted to the lower end of the housing 18. A second handle 22 is attached to the housing 18 a short distance below the power unit 12 to facilitate holding and maneuvering the Weedwacker 10 during normal use thereof. A flexible drive cable 24 is affixed at its upper end to the output shaft of the engine in the power unit 12 and extends through the tubular housing 18 to a rotor in the head 20. A cord or string 26 is attached to the rotor and orbits the axis of rotation of the rotor during use of the Weedwacker. The Weedwacker 10 is of a well known construction and such devices are shown, for example, in U.S. Pat. Nos. 4,226,021 and Insofar as the present invention is concerned, it is important that the power train housing 18 includes an intermediate bend of about forty-five degrees or more which is usual for many present day Weedwackers. it may be seen from FIG. 1 that the lower end portion of the tubular drive housing 18 bends rearwardly to a location below the handle 14. Moreover, the drive housing 18 lies in the central vertical plane of the power unit 12.

Referring to FIG. 2 there is shown an outboard motor assembly mounted to the transom 32 of a boat 34. The assembly includes the power until 12 of the Weedwacker 10 as well as the tubular drive housing 18 and the flexible drive cable 24. In addition an elongate tubular exhaust manifold 36 has replaced the original manifold 16, and a swivel mounting bracket assembly 39 has been mounted to the tubular drive housing 18 for mounting the motor to a boat.

The exhaust tube 36 fits telescopically over the exhaust outlet pipe 40 of the engine in the power unit 12 and is secured thereto by any suitable means such, for example, as a pair of springs 42 and 43 which are stretched between respective ones of a pair of lugs 44 and 45 affixed at diametrically opposite locations on the tube 26 as best shown in FIG. 3 and the inner flange on the case of the unit 12. The lower end of the exhaust tube 36 is mounted to the drive housing tube 18 by means of a clamp 37 which is welded to the exhaust tube 36 and removably secured to the housing tube 18 by a wingnut and bolt assembly 38.

The drive housing tube 18 is mounted to the case of the unit 12 by means of a bushing 46 which is affixed to the case of the unit 12 and a hex head screw 48 extends through a threaded hole in the busing 46 into locking engagement with the side of the housing tube 18. As may be seen, the housing tube 18 has been rotated through one-hundred eighty degrees from the position which it occupies in the Weedwacker 10 as shown in FIG. 1 so that the lower portion thereof is directed down and away from the handle 14.

A propeller or screw 50 is mounted to the bottom end of the flexible drive cable 24 and a rudder unit 52 is clamped to the tube a short distance above the bottom end so as to be horizontally aligned with the propeller 50. As may best be seen in FIG. 3, the unit 52 includes a flat plate 54 which is held in fixed relationship with the tube by means of a wingnut and bolt assembly 58.

The mounting bracket assembly 38 includes a swivel member 60 having a pair of spaced apart arms 62 and 64 between which a tubular bushing 66 is disposed. The tubular housing 18 is journaled in the bushing sleeve 66 and a pair of clamps 68 and 70 prevent up and down movement of the swivel bracket 60 and the bushing 66 relative to the housing tube 18.

The swivel bracket 60 is mounted for pivotal movement about a horizontal axis relative to a mounting clamp assembly 72 by means of a pintle 74 which extends through mutually aligned openings in the mounting bracket 72 and the swivel bracket 60. Accordingly, the motor assembly can be swung from the illustrated operative position to a substantially horizontal position with the propeller 50 out of the water. As alluded to hereinabove, because of the relative high speed of the propeller during use, any grasses or weeds which may collect around the bottom end of the housing 18 are easily removed by simply operating the motor while the propeller is out of the water.

After the Weedwacker has been converted to an outboard motor 30 as shown in FIG. 2 and mounted to the boat 34 it is preferable to swing the motor upwardly to lift the propeller 50 out of the water and to start the engine in the usual manner as, for example, pulling the starter cord. When the engine is running it may then be lowered into the water and the speed of the engine adjusted to the desired speed of the boat. The boat is steered by rotating the unit in the bushing 66 by means of the handle 14 which faces toward the interior of the boat.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. A method of converting a Weedwacker into an outboard motor, said Weedwacker including a first housing, an engine mounted in said first housing, a flexible drive shaft coupled to the output of said engine, a tubular rigid housing having one end thereof affixed to said first housing and enclosing said drive shaft, said tubular housing having a bend therein, a weed cutting device mounted to the other end of said tubular housing and coupled to said drive shaft and a muffler mounted to said engine over the exhaust port thereof; said method comprising the steps of:
   rotating said tubular housing through an angle of one-hundred eighty degrees relative to said first housing,
   removing said weed cutting device from said other end of said tubular housing and from said flexible shaft,
   mounting a propeller assembly including a bearing to said other end of said tubular housing and to said drive shaft with said bearing affixed to said drive shaft,
   mounting a swivel mounting bracket to said tubular housing at a location between said bend and said first housing,
   removing said muffler from said engine,
   attaching one end of an elongated tubular exhaust member to said engine over said exhaust port,
   said exhaust member having an open second end located between said bend in said tubular housing and said other end of said tubular housing, and
   clamping the section of said tubular housing between said bend and said first housing to said exhaust member,
   whereby, said exhaust member extends into the water when said outboard motor is mounted to a boat during use thereof.

2. A method according to claim 1, wherein said swivel bracket comprises,
   bearing means supporting said tubular housing for axial rotation therein and for permitting pivotal movement of said tubular housing between a first position wherein said portion of said tubular housing located above said bend is in a substantially vertical position and a second angular position to permit tilting said propeller assembly out of the water when said motor is mounted to a boat floating in the water.

3. A method according to claim 2, wherein said propeller assembly comprises,
   a planar fin affixed to said tubular housing with the plane of said fin including the axis of rotation of said propeller.

* * * * *